US00RE45860E

(19) United States
(12) Reissued Patent
Tsai

(10) Patent Number: US RE45,860 E
(45) Date of Reissued Patent: *Jan. 19, 2016

(54) DEVICE AND METHOD FOR REPROGRAMMING THE FUNCTION OF A DISPLAY SYSTEM

(71) Applicant: Novatek Microelectronics Corp., Hsinchu (TW)
(72) Inventor: Te-Hsiu Tsai, Taipei (TW)
(73) Assignee: Novatek Microelectronics Corp., Hsinchu (TW)

( * ) Notice: This patent is subject to a terminal disclaimer.
(21) Appl. No.: 14/470,681
(22) Filed: Aug. 27, 2014

Related U.S. Patent Documents

Reissue of:
(64) Patent No.: 6,697,058
Issued: Feb. 24, 2004
Appl. No.: 10/418,435
Filed: Apr. 17, 2003

U.S. Applications:
(63) Continuation of application No. 13/904,463, filed on May 29, 2013, which is an application for the reissue of Pat. No. 6,697,058, and a continuation of application No. 12/906,031, filed on Oct. 15, 2010, now Pat. No. Re. 44,388, which is an application for the reissue of Pat. No. 6,697,058, and a continuation of application No. 12/243,919, filed on Oct. 1, 2008, now Pat. No. Re. 41,966, which is an application for the reissue of Pat. No. 6,697,058, and a continuation of application No. 11/361,038, filed on Feb. 22, 2006, now Pat. No. Re. 40,574, which is an application for the reissue of Pat. No. 6,697,058, which is a continuation-in-part of application No. 09/543,008, filed on Apr. 4, 2000, now Pat. No. 6,577,301, and a continuation-in-part of application No. 09/575,890, filed on May 22, 2000, now Pat. No. 6,661,411, which is a continuation of application No. 09/414,251, filed on Oct. 7, 1999, now Pat. No. 6,295,053.

(30) Foreign Application Priority Data

Jul. 19, 1999 (TW) ..... 88112204
Dec. 16, 1999 (TW) ..... 88122129

(51) Int. Cl.
*G09G 5/00* (2006.01)
*G09G 3/36* (2006.01)

(52) U.S. Cl.
CPC ..... *G09G 5/006* (2013.01); *G09G 3/3611* (2013.01); *G09G 2370/04* (2013.01); *G09G 2370/047* (2013.01)

(58) Field of Classification Search
CPC ..... G06G 5/006; G06G 3/3611; G06G 2370/047; G06G 2370/04
See application file for complete search history.

(56) References Cited

U.S. PATENT DOCUMENTS

| | | | | | |
|---|---|---|---|---|---|
| 5,539,479 | A * | 7/1996 | Bertram | 725/37 |
| 5,657,091 | A * | 8/1997 | Bertram | 725/37 |
| 5,872,554 | A * | 2/1999 | Chang et al. | 345/690 |
| 6,011,546 | A * | 1/2000 | Bertram | 345/700 |
| 6,020,879 | A * | 2/2000 | Nakabayashi | 345/212 |
| 6,064,359 | A * | 5/2000 | Lin et al. | 345/89 |
| 6,243,741 | B1 * | 6/2001 | Utsumi | 709/208 |
| 6,268,845 | B1 * | 7/2001 | Pariza et al. | 345/581 |
| 6,295,053 | B1 * | 9/2001 | Tsai et al. | 345/204 |
| 6,302,795 | B1 * | 10/2001 | Ito | 463/29 |
| 6,525,667 | B1 * | 2/2003 | Fujita et al. | 340/815.4 |
| 6,567,845 | B1 * | 5/2003 | Chatani | 709/208 |

* cited by examiner

*Primary Examiner* — Yuzhen Ge
(74) *Attorney, Agent, or Firm* — J.C. Patents

(57) ABSTRACT

A monitor control system capable of reprogramming the function of a LCD monitor. The monitor control system utilizes VGA signal lines for video signal transmission during normal mode of operation and the same VGA signal lines for transmitting erase/record commands and data when the erasable programmable ROM inside the monitor demands reprogramming. Using an isolator circuit in the monitor control system for isolating an erase/record pathway of an erasable programmable ROM from a normal video pathway, data within the erasable programmable ROM can be modified without opening up the monitor casing. Hence, the modification of monitor function is much more convenient.

27 Claims, 5 Drawing Sheets

DEVICE AND METHOD FOR REPROGRAMMING THE FUNCTION OF A DISPLAY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application is a continuation-in-part of application Ser. No. 09/575,890, filed on May 22, 2000, now pending, which is a continuation-in-part of application Ser. No. 09/414,251, filed on Oct. 7, 1999, now U.S. Pat. No. 6,295,053. This application is also a continuation-in-part of application Ser. No. 09/543,008, filed on Apr. 4, 2000 now U.S. Pat. No. 6,577,301, now allowed.]

*More than one reissue application has been filed for the reissue of U.S. Pat. No. 6,697,058. The reissue applications are Reissue application Ser. No. 13/904,463, filed on May 29, 2013, now U.S. Pat. No. Re. 45,305, Reissue application Ser. No. 12/906,031, filed on Oct. 15, 2010, now U.S. Pat. No. Re. 44,388, Reissue application Ser. No. 12/243,919, filed on Oct. 1, 2008, now U.S. Pat. No. Re. 41,966, Reissue application Ser. No. 11/361,037, filed on Feb. 22, 2006, now U.S. Pat. No. Re. 40,422, and Reissue application Ser. No. 11/361,038, filed on Feb. 22, 2006, now U.S. Pat. No. Re. 40,574, which are based on U.S. application Ser. No. 10/418,435, filed on Apr. 17, 2003, now U.S. Pat. No. 6,697,058, which is a continuation-in-part of U.S. application Ser. No. 09/575,890, filed on May 22, 2000, now U.S. Pat. No. 6,661,411, which is a continuation of application Ser. No. 09/414,251, filed on Oct. 7, 1999, now U.S. Pat. No. 6,295,053, which claims the priority of Taiwan Application No. 88112204, filed on Jul. 19, 1999. The U.S. Pat. No. 6,697,058 is also a continuation-in-part of application Ser. No. 09/543,008, filed on Apr. 4, 2000, now U.S. Pat. No. 6,577,301, which claims the priority of Taiwan Application No. 88122129, filed on Dec. 16, 1999.*

*U.S. application Ser. No. 11/299,238, filed on Dec. 9, 2005, now U.S. Pat. No. Re. 40,325, is a reissue application of the U.S. application Ser. No. 09/575,890, filed on May 22, 2000, now U.S. Pat. No. 6,661,411.*

*U.S. application Ser. No. 13/904,463, filed on May 29, 2013, now pending, is a continuation reissue application of reissue application Ser. No. 12/906,031, filed on Oct. 15, 2010, now U.S. Pat. No. Re. 44,388.*

*This application is also a continuation reissue application of reissue application Ser. No. 12/906,031, filed on Oct. 15, 2010, now U.S. Pat. No. Re. 44,388, which is a continuation reissue application of reissue application Ser. No. 12/243,919, filed on Oct. 1, 2008, now U.S. Pat. No. Re. 41,966, which is a continuation reissue application of Reissue application Ser. No. 11/361,038, filed on Feb. 22, 2006, now U.S. Pat. No. Re. 40,574. The prior reissue application Ser. No. 11/361,038 is based on U.S. application Ser. No. 10/418,435, filed on Apr. 17, 2003, now U.S. Pat. No. 6,697,058. U.S. Pat. No. 6,697,058 is a continuation-in-part of application Ser. No. 09/575,890, filed on May 22, 2000, now U.S. Pat. No. 6,661,411, which is a continuation-in-part of application Ser. No. 09/414,251, filed on Oct. 7, 1999, now U.S. Pat. No. 6,295,053. The U.S. Pat. No. 6,697,058 is also a continuation-in-part of application Ser. No. 09/543,008, filed on Apr. 4, 2000, now U.S. Pat. No. 6,577,301. The entirety of each of the above-mentioned patents is hereby incorporated by reference herein and made a part of this specification.*

BACKGROUND OF THE INVENTION

1. Field of the Invention

The invention relates to a device and a method for repeatedly updating the function of a liquid quid crystal (LCD) monitor, and more particularly to a device and a method for repeatedly updating the function of a LCD monitor by using Display Data Channel (DDC) signal lines for signal transmission.

2. Description of the Related Art

In a current monitor system, particularly to a LCD monitor, a monitor controller must be exchanged when function modifying or debugging, resulting in high cost consumed. As to a further advanced monitor system, a corresponding monitor controller has a build-in read only memory (ROM) which is an erasable programmable read only memory. By updating data stored in the erasable programmable read only memory, function modification and debugging can be achieved.

Referring to FIG. 1, a conventional programmable LCD monitor with the circuit block diagram is shown. The conventional LCD monitor has a total of 18 VGA signal lines electrically coupled to a VGA card, which includes a vertical synchronous signal (Vsync) line, a horizontal synchronous signal (Hsync) line, a serial data (SDA) line, a serial clock (SCL) line, a ground (Gnd) line, a red (R) line, a green (G) line and a blue (B) line. During a normal operation, the LCD monitor controller 10 receives the VGA signals. The LCD monitor also coupled to a jumper 14 for connection to the flash ROM 20 or the erase/record socket 80. The flash ROM 20 stores the data used to control the displaying function. In addition, the LCD monitor 10 also has a panel connector to connect to the LCD displaying panel (not shown). Usually, the monitor controller 10 controls the display panel (not shown) based on the VGA signals. The Hsync, Vsync, SDA, SCL and R.G.B signal lines are electrically coupled to the monitor controller 10 for driving the scan and data signals to the LCD displaying panel.

When it is necessary to modify the function of the monitor system, data stored in the flash ROM 20 needs to be updated. First, the case of the monitor must be opened. Then, the first jumper 14 is used to separate the original circuit and the rewriting pathway to the flash ROM. And then, a cable connected to the socket 80 to transmit the updated data.

FIG. 2 is a schematic view showing the connection of a conventional LCD monitor system with a memory erase/record system. After the external casing of the monitor 100 is open, a main circuit board 110 is revealed. An erase/record socket 80 and a set of VGA signal lines 18 are laid on the circuit board 110. The first jumper 14 is found within a jumper area 22. The memory erase/record system 90 includes a ROM writer 92, a computer system 94 and a programming monitor 96. The computer system 94 controls all the operations of the ROM writer 92. Programming status of the operation can be observed through the programming monitor 96. When the ROM writer is plugged into the erase/record socket 80 of the main circuit board 110, memory inside the monitor can be reprogrammed by the computer 94 so that a different monitor function can be used.

Obviously, it is really inconvenient to update the monitor system because the case of the conventional monitor must be first opened, and then the jumper has to be switched for recording the erasable programmable read only memory of the monitor controller 10.

As a result, it is rather inconvenience when the monitor system, such as LCD monitor, is updated because it is necessary to open the case of the monitor and to switch jumpers for recording the erasable programmable read only memory of the monitor controller 10.

SUMMARY OF THE INVENTION

The invention is to provides a device for reprogramming function of a LCD monitor, which needs not to open the case and needs no the conventional jumper. Also and, it is not necessary to include a connector with pre-designed layout for isolating the previously original circuit and the rewriting pathway to the flash memory. The displaying function of the LCD monitor can be repeatedly updated and the information about on-screen display.

The present invention provides a LCD monitor control system capable of reprogramming monitor function. The monitor control system utilizes the VGA signal lines for transmitting signals during normal operation. The same VGA signal lines are also used for transmitting erase/record commands to the monitor system and to erase/record data into an external erasable programmable ROM.

The invention provides a device for reprogramming function of a LCD monitor, which includes a set of video graphic adapter (VGA) signal lines for transmitting a plurality of erase/record commands and a plurality of erase/record data. A signal detector is coupled to the VGA signal lines for detecting and re-transmitting the erase/record commands and data. An activation device is coupled to the signal detector, wherein the activation device is normally connected to a video pathway, but as soon as erase/record commands are detected, the activation device is switched to an erase/record pathway so that erase/record commands and data can be re-directed. A read-only-memory (ROM) erase/record command decoder is coupled to the activation device via the erase/record pathway, wherein the decoder translates the erase/record commands into a plurality of erase/read/write signals and translates the erase/record data into a plurality of address signals and a plurality of data signals. A plurality of address signals, a plurality of data signals and a plurality of control signals are coupled to the ROM erase/record command decoder. Consequently, data stored in the external ROM unit can be modified, according to the address, data and erase/read/write signals coming from the command decoder. A mode return device is coupled to the ROM erase/record command decoder and the activation device. Wherein, the reprogramming status of the ROM unit can be determined from the address, data and read/write signals so that the activation device can be triggered to switch over connection from the erase/record pathway to the video pathway as soon as reprogramming is finished.

In the foregoing device, the signal detector further includes an inter-integrated circuit multiple address content comparator circuit, which is coupled to the VGA signal lines for comparing with a plurality of consecutive address sequences in the erase/record data such that a set signal is transmitted when there is a match with a pre-set address sequence. A monitor-in-system programming control flag unit is coupled to the inter-integrated circuit multiple address content comparator circuit for transmitting a start signal after receiving the set signal.

In the foregoing device, the activation device further includes a monitor-in-system reprogramming initialization circuit for producing a select signal after receiving the start signal, as well as an erase/record pathway isolator for switching over connection from the video pathway to the erase/record pathway after receiving the select signal and transmitting the erase/record commands and data via the erase/record pathway.

In the foregoing device, the ROM erase/record command decoder further includes an inter-integrated interface circuit for receiving and translating the erase/record commands and data, as well as an erase/record command decoder for receiving translated erase/record commands and data and outputting address, data and erase/read/write signals.

In the foregoing device, the erase/record command decoder further includes a hidden ROM for holding a program code for erase/record commands; a random access memory (RAM) unit for holding erase/record data; a central processing unit coupled to the hidden ROM, the RAM unit and the inter-integrated interface circuit. Wherein the central processing unit receives the erase/record commands and data passing through the inter-integrated circuit interface circuit and then stores the erase/record data in the RAM unit, while the erase/record commands are decoded by referring to the program code in the hidden ROM and then the decoded commands are re-transmitted. An erase/record control register coupled to the central processing unit for receiving the decoded erase/record commands and converting the erase/record commands into the interface control signals or erase/read/write signals, and converting the erase/record data stored in the RAM unit into address and data signals.

The invention further provides a system for reprogramming the function of a liquid crystal display (LCD) monitor, which comprises an erase/record device for holding and transmitting a plurality of erase/record commands and a plurality of erase/record data. A set of video graphic adapter (VGA) signal lines coupled to the erase/record device for transmitting the erase/record commands and data. And, a LCD monitor controller with a monitor-in-system programming function, wherein the LCD monitor controller is coupled to the VGA signal lines so that the erase/record commands of the erase/record device and data are received from the erase/record device via the VGA signal lines, and then a plurality of address signals, a plurality of data signals, and a plurality of control signals are exported for reprogramming a ROM unit, wherein the ROM unit coupled to the LCD monitor controller via signal lines for transferring the address signals, the data signals and the control signals, so that data stored in the ROM unit can be modified according to the address signals and the control signals, and the data signals coming from the LCD monitor controller.

In the forgoing invention, the LCD monitor controller with monitor-in-system programming function includes a signal detector coupled to the VGA signal lines for detecting and transmitting the erase/record commands and data. An activation device is coupled to the signal detector. Wherein the activation device is normally connected to a video pathway, but as soon as erase/record commands is detected, the activation device is switched to an erase/record pathway so that erase/record commands and data can be re-directed. A ROM erase/record command decoder is coupled to the activation device via the erase/record pathway, wherein the decoder translates the erase/record commands into a plurality of erase/read/write signals and translates the erase/record data into a plurality of address signals and a plurality of data. A mode return device is coupled to the ROM erase/record command decoder and the activation device. Wherein, the reprogramming status of the ROM unit can be determined from the address, data and erase/read/write signals so that the activation device can be triggered to switch over connection from the erase/record pathway to the video pathway as soon as reprogramming is finished.

The invention also provides a method for reprogramming the function of a LCD monitor system. The method includes tapping a plurality of signals from a set of video graphic adapter (VGA) signal lines to perform a plurality of consecutive address sequence comparisons with a pre-set address sequence. A programming mode inside the LCD monitor system is triggered when one of the tapped consecutive address sequences matches that of the pre-set address sequence. An erase/record command is read and it is decided what actions to take as soon as the programming mode is activated. The erase/record data is read and the erase/record data is written into a memory unit when the erase/record command is for a write operation, and then returning to the previous step. When the erase/record command demands a return to a non-programming mode, the process returns back to the very first step.

BRIEF DESCRIPTION OF THE DRAWINGS

The invention will become more fully understood from the detailed description given hereinafter and the accompavying drawings which are given by way of illustration only, and thus do not limit the present invention, and wherein.

DETAILED DESCRIPTION OF THE PREFERRED EMBODIMENTS

Figure 1:
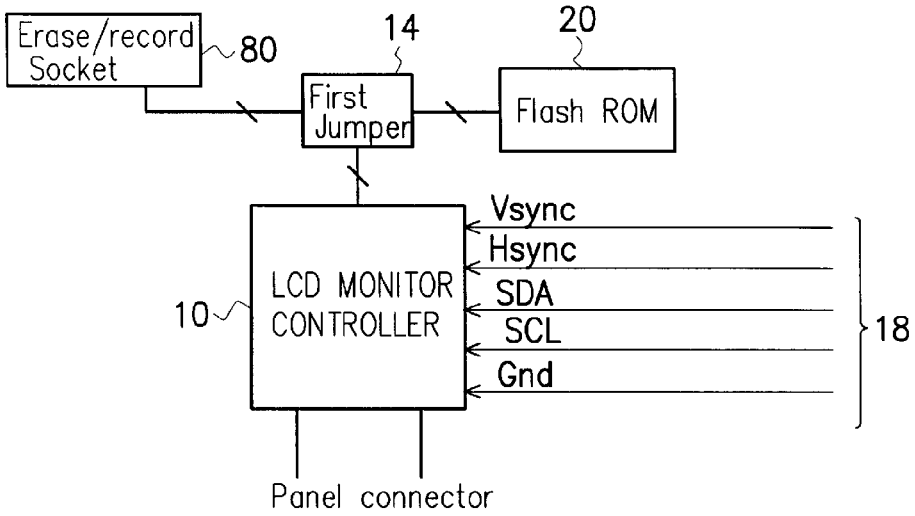
FIG. 1 (PRIOR ART)
FIG. 1 is a block diagram showing the circuit connections of various elements of a conventional programmable LCD monitor system.
Figure 2:
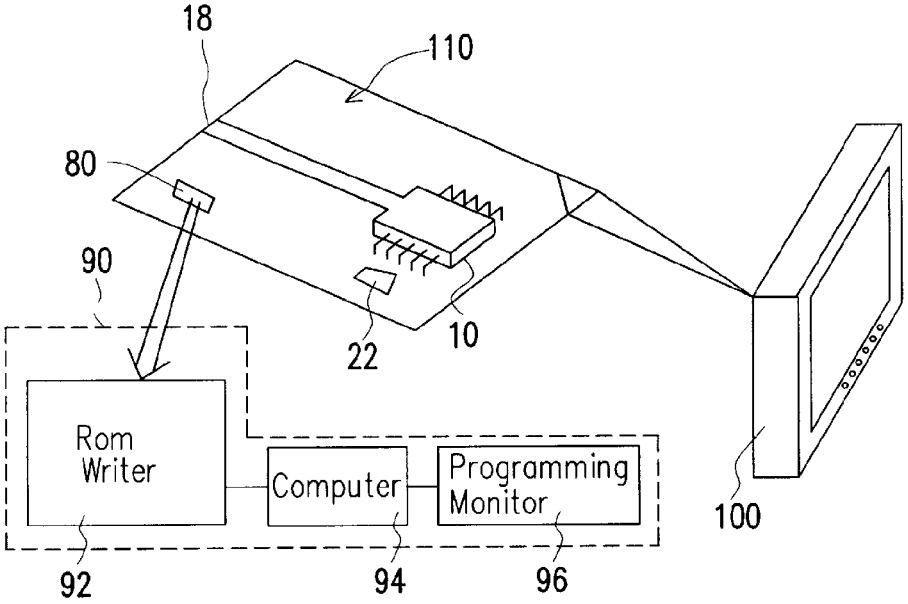
FIG. 2 (PRIOR ART)
FIG. 2 is a schematic view showing the connection of a conventional LCD monitor system with a memory erase/record system.
Figure 3:
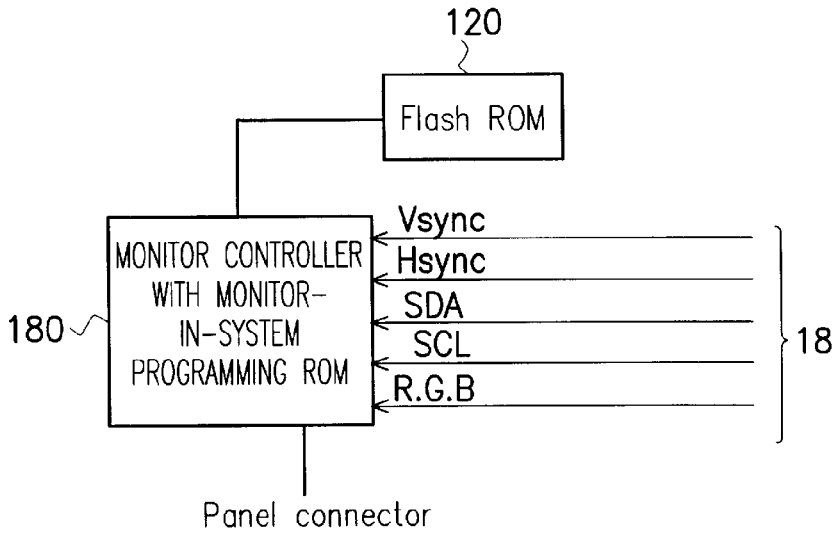
FIG. 3 is a block diagram showing the circuit connections of various elements of a programmable monitor system according to this invention.

Referring to FIG. 3, a block diagram schematically shows the circuit connections of various elements of a programmable monitor system according to this invention. The invention uses a monitor controller 180 with monitor-in-system programming function to receive the VGA signals 18, including Vsync, Hsync, SDA, SCL, and R.G.B. signals. The monitor controller 180 is also coupled to a LCD displaying panel (not shown) through a panel connector and a flash ROM 120. The VGA signals 18 are input to the monitor controller 180, then the monitor controller 180 also refers to the program stored in the flash ROM 120 to drive the LCD displaying panel.

When the function of driving program in the flash ROM 120 is desired to be updated, the updated program and data can be written to the flash ROM 120 without the need of opening the case of the monitor and the jumper for switching. For example, the updated information can be input through the SDA and SCL signal lines. Compared to the prior art, it is unnecessary to open the case of the monitor. In other words, the function update of the monitor can be achieved by just using the original signal lines 18.

Figure 4:
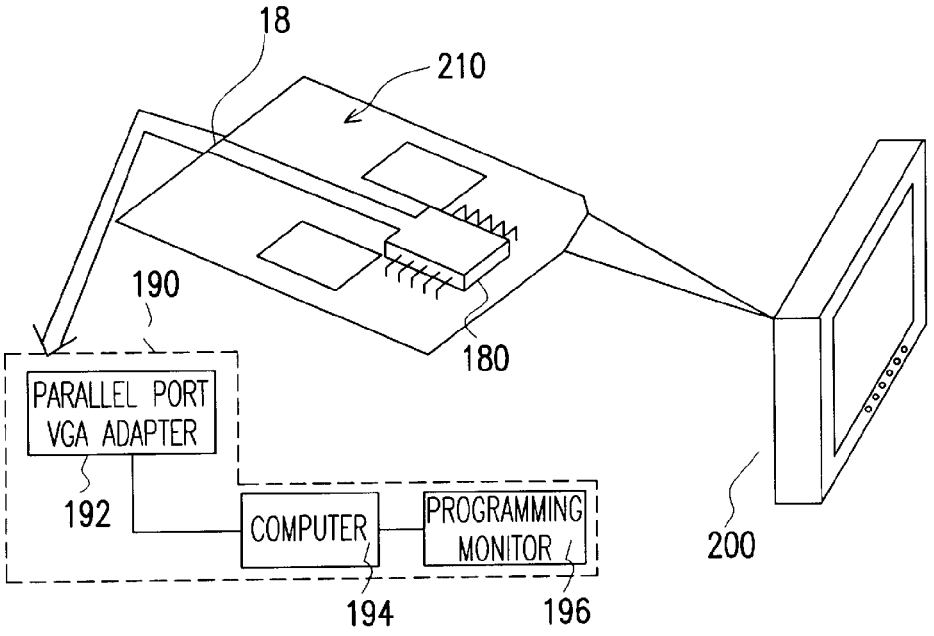
FIG. 4 is a schematic view showing the connection of a LCD monitor system according to this invention with an erase/record device.

FIG. 4 is a schematic view showing the connection of a LCD monitor system according to this invention with an erase/record device. The main circuit board 210 inside a monitor 200, such as a LCD monitor, is connected to an erase/record device 190 via the set of VGA signal lines 18. To reprogram the function of the monitor, erase/record commands and erase/record data are first programmed into a computer system 194. The erase/record commands and data are translated into an inter-integrated circuit (IIC) interface format. The translated erase/record commands and data are output from a parallel port VGA adapter via the set of VGA signal lines into the ROM unit inside the monitor controller 180.

Alternatively, the erase/record device can utilize an inter-integrated circuit (IIC) interface circuit platform. To reprogram the function of the monitor, erase/record commands and data are first written into the memory area of the IIC interface circuit platform. The erase/record commands and data are sent in the IIC interface format to the ROM inside the monitor controller 180 directly via the VGA signal lines.

In this embodiment of the invention, the serial data line SDA and the serial clock line SCL of the VGA signal lines are used to transmit erase/record commands and data in the IIC interface format. In practice, any two of the signal lines including SDA, SCL, Hsync and Vsync can be used for transmitting erase/record commands and data in the IIC interface format.

Figure 5:
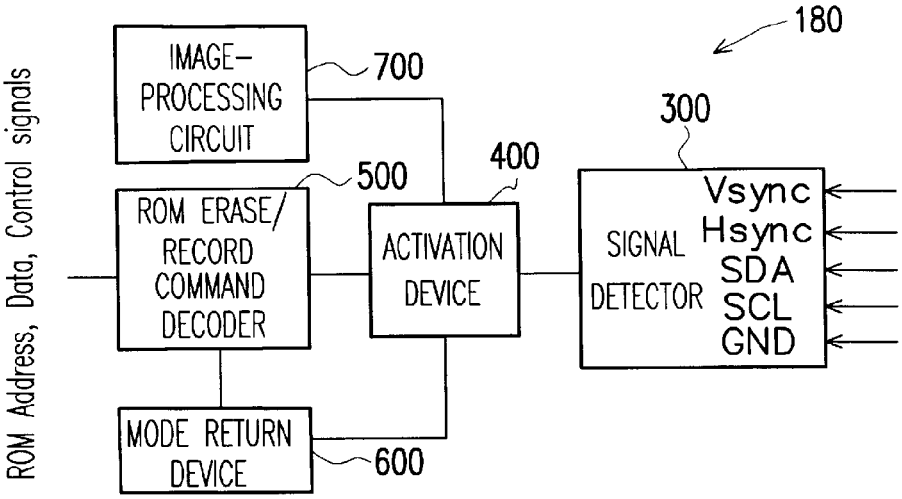
FIG. 5 is a block diagram showing the circuit connections of various internal elements of the LCD monitor controller according to this invention.

FIG. 5 is a block diagram showing the circuit connections of various internal elements of the monitor controller according to this invention. The monitor controller 180, which carries a ROM with a built-in control program, includes a signal detector 300, an activation device 400, a ROM erase/record command decoder 500, a mode return device 600, image-processing circuits 700, which is the circuits other than the circuits belonging to the monitor controller 180, and a ROM unit 800.

VGA signal lines are connected to the signal detector 300. The signal detector 300 is a device for detecting any erase/record commands and data on the VGA signal lines. Signals are next delivered to the activation device 400.

The activation device 400 has a video pathway and an erase/record pathway. When erase/record commands are detected by the signal detector 300, the erase/record commands and data are re-directed to the ROM erase/record command decoder 500 via the erase/record pathway by the activation device 400. In the normal mode of operation, video signals are re-directed to the image-processing circuits 700 via the video pathway by the activation device 400.

The ROM erase/record command decoder 500 translates the erase/record commands into erase/read/write signals to be used by the ROM unit 120 and the erase/record data are also translated into addresses and data signals. The translated signals are the sent to the ROM unit 120 so that monitor function can be modified.

The ROM erase/record command decoder 500 produces the address signals, the data signals, and the control signals and then exports the signals to an external ROM unit (not shown), which stores a program code and data used for performing displaying function. The external ROM can, for example, be the flash memory or erasable programmable ROM. However, if an updated program is desired, the program code can be erased and reprogrammed according to the address signals, data signals and erase/read/write signals picked up by the ROM unit.

The mode return device 600 is coupled to the ROM erase/record command decoder 500 and the activation device 400. According to address, data and read/write signals feedback from the decoder 500, progress in the reprogramming of ROM 120 can be determined. When the reprogramming is finished, the mode return device 600 signals to the activation device 400 so that connection to the video pathway is re-established.

In the following, elements and operation of each device are described in detail.

Figure 6:
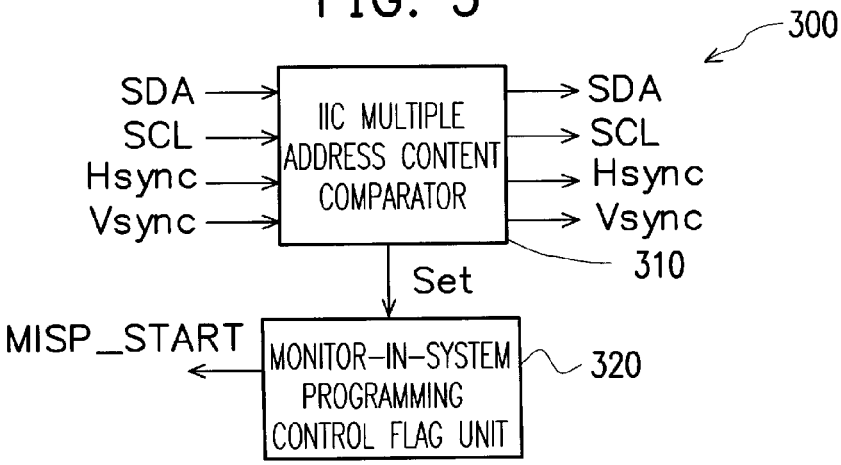
FIG. 6 is a block diagram showing the circuit connections of various internal elements of the signal detector according to this invention.

FIG. 6 is a block diagram showing the circuit connections of various internal elements of the signal detector according to this invention. The inter-integrated circuit multiple address content comparator 310 of the signal detector 300 taps the signals on the signal line SDA continuously, trying to match a pre-set address sequence. When the tapped consecutive address sequence matches that of the pre-set address sequence, a Set signal is sent to a monitor-in-system programming control flag unit 320. The transmission of a Set signal to the flag unit 320 indicates that reprogramming of the monitor system is desired. Consequently, a monitor-in-system programming start MISP_START signal is transmitted to the activation device 400.

Figure 7:
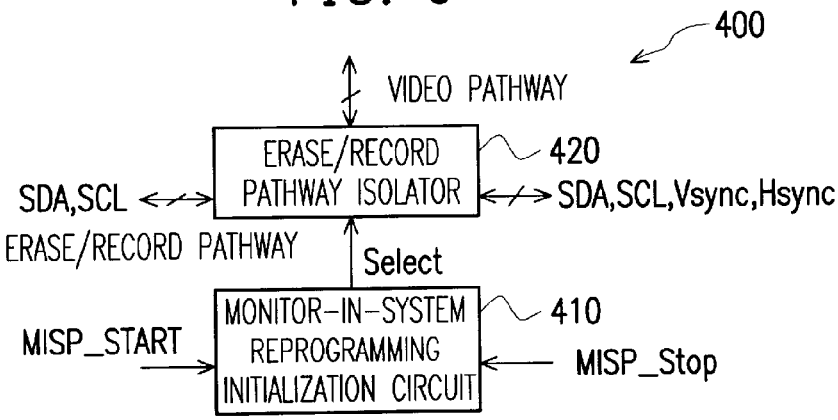
FIG. 7 is a block diagram showing the circuit connections of various internal elements of the activation device according to this invention.
Figure 8:
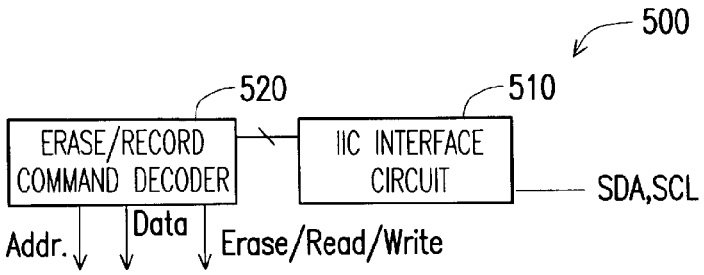
FIG. 8 is a block diagram showing the circuit connections of various internal elements of the ROM erase/record command decoder according to this invention.

FIG. 7 is a block diagram showing the circuit connections of various internal elements of the activation device according to this invention. As soon as the monitor-in-system reprogramming initialization circuit 410 of the activation device 400 picks up the MISP_START signal from the control flag unit 320, a Select signal is transmitted to an erase/record pathway isolator 420. On receiving the Select signal, the isolator 420 switches over the connection from the video pathway to the erase/record pathway so that erase/record commands and data signals is able to pass on. FIG. 8 is a block diagram showing the circuit connections of various internal elements of the ROM erase/record command decoder according to this invention. The IIC interface circuit 510 of the ROM erase/record command decoder 500 picks up the erase/record commands and data from the activation device 400. The erase/record commands and data are translated into an erase/record commands and data format compatible to the erase/record command decoder 520. The erase/record command decoder 520 converts the translated erase/record commands and data into address, data and erase/read/write signals. These address, data and erase/read/write signals are transmitted to the ROM 120 for reprogramming.

Figure 9:
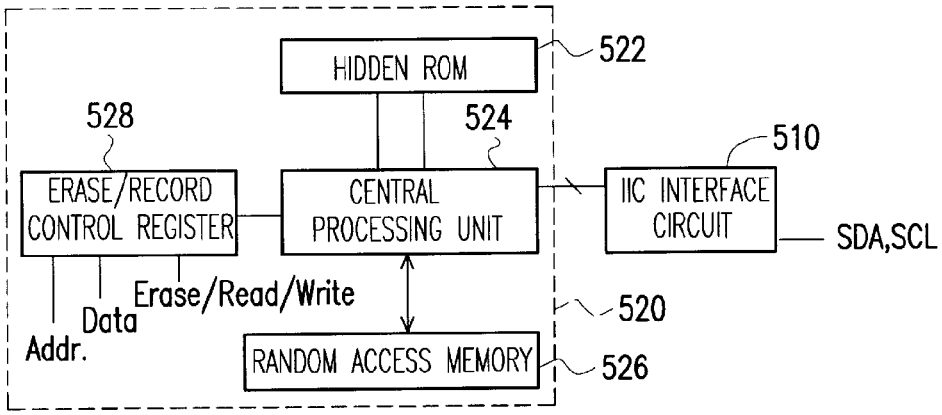
FIG. 9 is a block diagram showing the circuit connections of various internal elements of the erase/record command decoder.

FIG. 9 is a block diagram showing the circuit connections of various internal elements of the erase/record command decoder. The erase/record command decoder 520 includes a hidden ROM 522, a RAM unit 526, a central processing unit (CPU) 524 and an erase/record control register 528.

The hidden ROM 522 is a device for storing the program code of erase/record commands, and the RAM unit 526 is a device for storing erase/record data. The central processing unit 524 picks up the translated erase/record commands and data from the IIC interface circuit. The erase/record data is stored in the RAM unit 526. The erase/record commands are decoded using the decoding program inside the hidden ROM 522. The decoded erase/record commands are transmitted to an erase/record control register 528 where the commands are converted into ROM interface control signals or erase/read/write signals. The erase/record data stored in the RAM unit 526 is converted into address and data signals by the central processing unit 524.

The erase/record command decoder 520 can also be implemented using a hardware circuit. The erase/record commands picked up from the IIC circuit are divided into different states so that the commands can easily be converted into erase/read/write, address and data signals.

Figure 10:
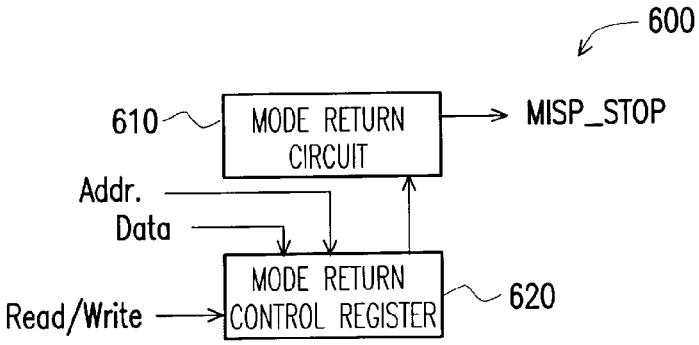
FIG. 10 is a block diagram showing the circuit connections of various internal elements of the mode return device.

FIG. 10 is a block diagram showing the circuit connections of various internal elements of the mode return device. The mode return register 620 of the mode return device 600 picks up feedback address, data and read/write signals from the erase/record control register 528. When the erase/record procedure is complete, a mode return signal is sent to the mode return circuit 610. As soon as the mode return circuit 610 picks up the mode return signal, a monitor-in-system programming MISP_STOP signal is issued to the activation device 400. The activation device 400 immediately switches over the connection from the erase/record pathway to the video pathway.

Figure 11:
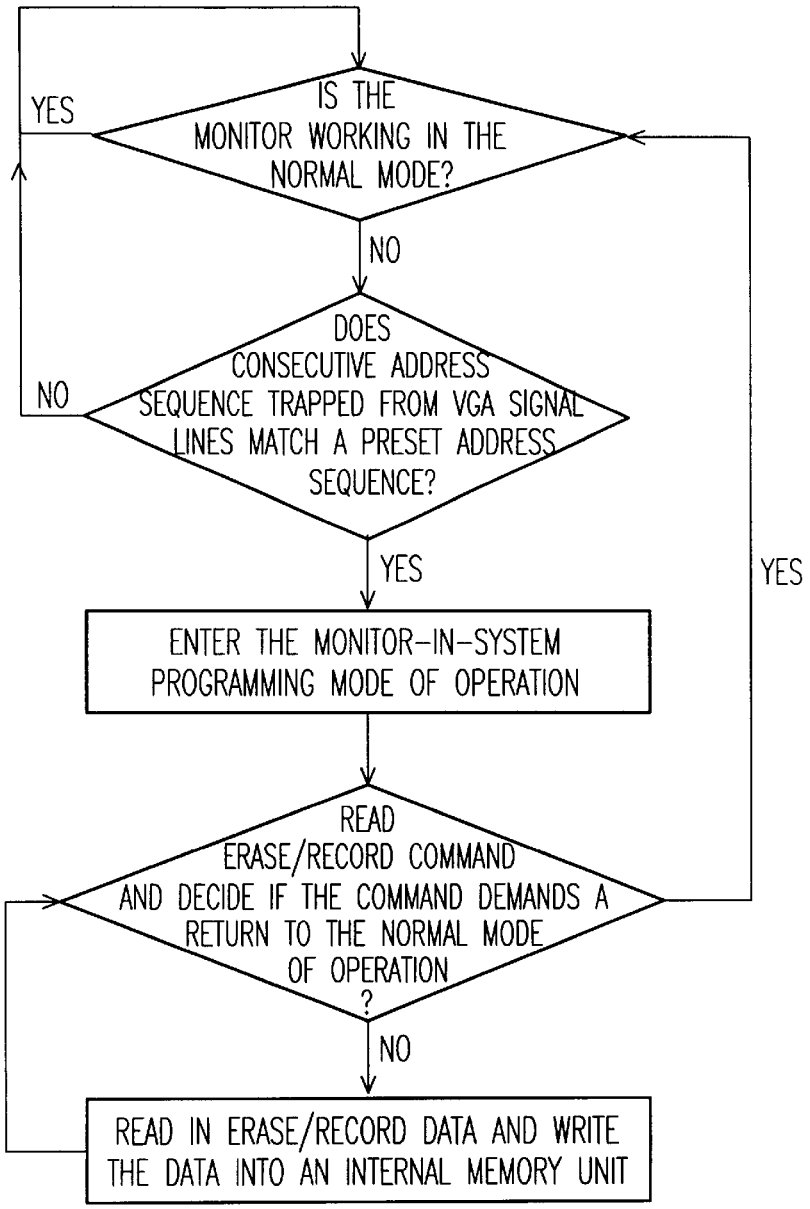
FIG. 11 is a flow chart showing the steps for reprogramming the memory inside a LCD monitor system of this invention.

FIG. 11 is a flow chart showing the steps for reprogramming the ROM inside a monitor system of this invention. First, the monitor system monitors incoming signals repeatedly to check for anything abnormal. Nothing happens in the normal or the video transmission mode. When something abnormal is sensed by the monitor system, signals on the VGA signal lines are tapped and a consecutive address sequence is compared with a pre-set address sequence. If the tapped address does not match the pre-set address, the monitor system returns to a normal mode. However, if there is a match between the tapped address sequence and the pre-set address sequence, the monitor system enters a reprogramming mode. The incoming erase/record commands are checked by the monitor system. If the erase/record command demands that the system perform a memory write operation, erase/record data are written into the ROM unit inside the monitor controller. Thereafter, the next erase/record command is read. On the other hand, if the erase/record command demands a return to the normal mode of operation, the monitor system returns to the normal mode and mode checking is again carried out.

In summary, the invention provides a monitor control system capable of reprogramming the function of a LCD monitor. The monitor control system utilizes the VGA signal lines for signal transmission in normal operation and the same VGA signal lines in the modification of data inside the erasable programmable ROM of a monitor controller in the reprogramming mode. The original cable used by the VGA card can be used to rewrite a program used by the LCD monitor controller without opening the case and no need of the jumper. Also and, the related on-screen display information can also be updated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

[1. A device for reprogramming the function of a liquid crystal display (LCD) monitor, comprising:

a set of video graphic adapter (VGA) signal lines for transmitting a plurality of erase/record commands and a plurality of erase/record data;

a signal detector coupled to the VGA signal lines for detecting and re-transmitting the erase/record commands and data;

an activation device coupled to the signal detector, wherein the activation device is normally connected to a video pathway, but as soon as erase/record commands are detected, the activation device is switched to an erase/record pathway so that erase/record commands and data can be re-directed;

a read-only-memory (ROM) erase/record command decoder connected to the activation device via the erase/record pathway, wherein the decoder translates the erase/record commands into a plurality of control signals and translates the erase/record data into a plurality of address signals and a plurality of data signals;

a plurality of signal lines for transferring the control signals, the address signals, and the data signals to an external ROM unit, wherein a content of the ROM unit can be modified according to the control signals, the address signals, and the data signals; and a mode return device coupled to the ROM erase/record command decoder and the activation device, wherein the reprogramming status of the ROM unit can be determined from the address, data and read/write signals so that the activation device can be triggered to switch over connection from the erase/record pathway to the video pathway as soon as reprogramming is finished.]

[2. The device of claim 1, wherein the erase/record commands and data come from an erase/record device that couples to the VGA signal lines.]

[3. The device of claim 2, wherein the erase/record device is a computer platform that sends the erase/record commands and data in an inter-integrated circuit interface format via a parallel port VGA adapter.]

[4. The device of claim 2, wherein the erase/record device is an inter-integrated circuit interface circuit platform for transmitting erase/record commands and data in an inter-integrated circuit interface format.]

[5. The device of claim 1, wherein the signal detector further includes:

an inter-integrated circuit multiple address content comparator circuit coupled to the VGA signal lines for comparing with a plurality of consecutive address sequences in the erase/record data such that a set signal is transmitted when there is a match with a pre-set address sequence; and a monitor-in-system programming control flag unit coupled to the inter-integrated circuit multiple address content comparator circuit for transmitting a start signal after receiving the set signal.]

[6. The device of claim 1, wherein the activation device further includes:

a monitor-in-system reprogramming initialization circuit for producing a select signal after receiving the start signal; and an erase/record pathway isolator for switching over connection from the video pathway to the erase/record pathway after receiving the select signal and transmitting the erase/record commands and data via the erase/record pathway.]

[7. The device of claim 1, wherein the ROM erase/record command decoder further includes:

an inter-integrated interface circuit for receiving and translating the erase/record commands and data; and an erase/record command decoder for receiving translated erase/record commands and data and outputting address, data and erase/read/write signals.]

[8. The device of claim 7, wherein the erase/record command decoder further includes:

a hidden ROM for holding a program code for erase/record commands;

a random access memory (RAM) unit for holding erase/record data;

a central processing unit coupled to the hidden ROM, the RAM unit and the inter-integrated interface circuit, wherein the central processing unit receives the erase/record commands and data passing through the inter-integrated circuit interface circuit and then stores the erase/record data in the RAM unit, while the erase/record commands are decoded by referring to the program code in the hidden ROM and then the decoded commands are re-transmitted; and an erase/record control register coupled to the central processing unit for receiving the decoded erase/record commands and converting the erase/record commands into the interface control signals or erase/read/write signals, and converting the erase/record data stored in the RAM unit into address and data signals.]

[9. The device of claim 7, wherein the erase/record command decoder is a hardware circuit that separates each erase/record command picked up by the inter-integrated circuit into a plurality of states for ease of decoding and converts the erase/record commands and data into erase/read/write, address and data signals.]

[10. The device of claim 1, wherein the mode return device further includes:

a mode return control register for receiving the address, data and erase/read/write signals and producing a mode return signal as soon as a reprogramming operation is finished; and a mode return circuit coupled to the mode return control register and the activation device for sending a stop signal to the activation device after receiving the mode return signal so that the activation device switches over connection from the erase/record pathway back to the video pathway.]

[11. The device of claim 1, wherein the external ROM unit comprises a flash ROM unit.]

[12. The device of claim 1, wherein the external ROM unit comprises an erasable programmable ROM unit.]

[13. A system for reprogramming the function of a liquid crystal display (LCD) monitor, comprising:

an erase/record device for holding and transmitting a plurality of erase/record commands and a plurality of erase/record data;

a set of video graphic adapter (VGA) signal lines coupled to the erase/record device for transmitting the erase/record commands and data; and a LCD monitor controller with a monitor-in-system programming function, wherein the LCD monitor controller is coupled to the VGA signal lines so that the erase/record commands of the erase/record device and data are received from the erase/record device via the VGA signal lines, and then a plurality of address signals, a plurality of data signals, and a plurality of control signals are exported for reprogramming a ROM unit, wherein the ROM unit coupled to the LCD monitor controller via signal lines for transferring the address signals, the data signals and the control signals, so that data stored in the ROM unit can be modified according to the address signals and the control signals, and the data signals coming from the LCD monitor controller.]

[14. The system of claim 13, wherein the erase/record device is a computer platform that sends the erase/record commands and data in an inter-integrated circuit interface format via a parallel port VGA adapter.]

[15. The system of claim 13, wherein the erase/record device is an inter-integrated circuit interface circuit platform for transmitting erase/record commands and data in an inter-integrated circuit interface format.]

[16. The system of claim 13, wherein the LCD monitor controller with monitor-in-system programming function includes:

a signal detector coupled to the VGA signal lines for detecting and transmitting the erase/record commands and data;

an activation device coupled to the signal detector, wherein the activation device is normally connected to a video pathway, but as soon as erase/record commands is detected, the activation device is switched to an erase/record pathway so that erase/record commands and data can be re-directed;

a ROM erase/record command decoder connected to the activation device via the erase/record pathway, wherein the decoder translates the erase/record commands into a plurality of erase/read/write signals and translates the erase/record data into a plurality of address signals and a plurality of data signals; and a mode return device coupled to the ROM record command decoder and the activation device, wherein the reprogramming status of a ROM unit can be determined from the address, data and erase/read/write signals so that the activation device can be triggered to switch over connection from the erase/record pathway to the video pathway as soon as reprogramming is finished.]

[17. The system of claim 16, wherein the signal detector further includes:

an inter-integrated circuit multiple address content comparator circuit coupled to the VGA signal lines for comparing with a plurality of consecutive address sequences in the erase/record data such that a set signal is transmitted when there is a match with a pre-set address sequence; and a monitor-in-system programming control flag unit coupled to the inter-integrated circuit multiple address content comparator circuit for transmitting a start signal after receiving the set signal.]

[18. The system of claim 16, wherein the activation device further includes:

a monitor-in-system reprogramming initialization circuit for producing a select signal after receiving the start signal; and an erase/record pathway isolator for switching over connection from the video pathway to the erase/record pathway after receiving the select signal and transmitting the erase/record commands and data via the erase/record pathway.]

[19. The system of claim 16, wherein the ROM erase/record command decoder further includes:

an inter-integrated interface circuit for receiving and translating the erase/record commands and data; and an erase/record command decoder for receiving translated erase/record commands and data and outputting address, data and erase/read/write signals.]

[20. The system of claim 19, wherein the erase/record command decoder further includes:

a hidden ROM for holding a program code for erase/record commands;

a random access memory (RAM) unit for holding erase/record data;

a central processing unit coupled to the hidden ROM, the RAM unit and the inter-integrated interface circuit, wherein the central processing unit receives the erase/record commands and data passing through the inter-integrated circuit interface circuit and then stores the erase/record data in the RAM unit, while the erase/record commands are decoded by referring to the program code in the hidden ROM after which the decoded commands are re-transmitted; and an erase/record control register coupled to the central processing unit for receiving the decoded erase/record commands and converting the erase/record commands into the interface control signals or erase/read/write signals, and converting the erase/record data stored in the RAM unit into address and data signals.]

[21. The system of claim 19, wherein the erase/record command decoder is a hardware circuit that separates each erase/record command picked up by the inter-integrated circuit into a plurality of states for ease of decoding and converts the erase/record commands and data into erase/read/write, address and data signals.]

[22. The system of claim 16, wherein the mode return device further includes:

a mode return control register for receiving the address, data and read/write signals and producing a mode return signal as soon as a reprogramming operation is finished; and a mode return circuit coupled to the mode return control register and the activation device for sending a stop signal to the activation device after receiving the mode return signal so that the activation device switches connection from the erase/record pathway back to the video pathway.]

[23. The system of claim 13, wherein the ROM unit inside the monitor controller is a flash ROM unit.]

[24. The system of claim 13, wherein the ROM unit comprises an erasable programmable ROM unit.]

[25. A method for reprogramming the function of a liquid crystal display (LCD) monitor system, comprising the steps of:

tapping a plurality of signals from a set of video graphic adapter (VGA) signal lines to perform a plurality of consecutive address sequence comparisons with a preset address sequence;

triggering a programming mode inside the LCD monitor system when one of the tapped consecutive address sequences matches that of the pre-set address sequence;

reading an erase/record command and deciding what actions to take as soon as the programming mode is activated;

reading in erase/record data and writing the erase/record data into a memory unit when the erase/record command is for a write operation, and then returning to the previous step; and returning to the very first step when the erase/record command demands a return to a non-programming mode.]

[26. The method of claim 25, wherein reprogramming starts only when the LCD monitor system is not operating in a normal mode.]

[27. The method of claim 25, wherein the LCD monitor system continues to operate in a normal video transmission mode when the tapped consecutive address sequence does not match any pre-set address sequence.]

28. A display device for reprogramming the function of a display system, comprising:

a detecting device for detecting a first signal transmitted through a USB signal line and determining whether to generate a second signal indicative of a switching from a normal mode to a programming mode according to the first signal;

a starting and decoding device, coupled to the detecting device, for switching the display device operating from the normal mode to the programming mode in response to the second signal, wherein in the normal mode, the starting and decoding device transmits a third signal transmitted through the USB signal line to a imaging-processing circuit for receiving image processing, and in the programming mode, the starting and decoding device converts a fourth signal into a fifth signal for modifying a content of a memory within the display system so as to update the function of the display system.

29. The display device of claim 28, wherein in the programming mode, the fourth signal comprises recording commands and recording data, and the fifth signal comprises erase/read/write signals and an address signal and a data signal such that the content of the memory is modified according to the erase/read/write signals and the address signal and the data signal.

30. The display device of claim 28, wherein in the programming mode, the second signal comprises video signals such that the image processing is performed on the video signals.

31. The display device of claim 28, wherein the detecting device determines whether a consecutive address sequence represented by the first signal matches that of a pre-set address sequence and generates the second signal indicative of a switching from the normal mode to the programming mode if it determines that the consecutive address sequence matches that of the pre-set address sequence.

32. The display device of claim 28, wherein the memory is a non-volatile memory.

33. The display device of claim 28, wherein the starting and decoding device switches from the normal mode to the programming mode by switching from a visual path to a recording path.

34. A display system, comprising:

a USB signal line;

a memory for storing data related to the function of the display system; and a display device, coupled to the USB signal line and the memory, for receiving a first signal transmitted through the USB signal line and determining whether to switch from a normal mode to a programming mode according to the first signal, wherein in the normal mode, the display device receives second signal transmitted through the USB signal line and controls the second signal to receive image processing, and in the programming mode, the display device receives a third signal transmitted through the USB signal line and modifies a content of the memory so as to update the function of the display system according to the third signal.

35. The display system of claim 34, wherein in the programming mode, the third signal comprise recording commands and recording data such that the content of the memory is modified according to the recording commands and the recording data.

36. The display system of claim 35, wherein the display device further determines whether to return to the normal mode from the programming mode according to the recording commands.

37. The display system of claim 35, wherein in the programming mode, the display device converts the recording commands into erase/read/write signals and converting the recording data into an address signal and a data signal so as to modify the content of the memory according to the erase/read/write signals and the address signal and the data signal.

38. The display system of claim 35, wherein in the programming mode, the second signal comprises video signals such that the image processing is performed on the video signals.

39. The display system of claim 35, wherein the display device determines whether a consecutive address sequence represented by the first signal matches that of a pre-set address sequence and determines to switch to the programming mode if it determines that the consecutive address sequence matches that of the pre-set address sequence.

40. The display system of claim 35, wherein the memory is a non-volatile memory.

41. The display system of claim 35, wherein the display device switches from the normal mode to the programming mode by switching from a visual path arranged for transmitting the second signal to a imaging-processing circuit, to a recording path arranged for transmitting the second signal to a decoder coupled to the memory.

42. The display system of claim 35, wherein the display device switches from the normal mode to the programming mode by switching from a visual path coupled to a imaging-processing circuit for performing the image processing, to a recording path coupled to the memory.

43. A method for reprogramming the function of a display system, comprising:

receiving a first signal transmitted through a USB signal line; and determining whether to switch from a normal mode to a programming mode according to the first signal;

in the normal mode, receiving a second signal transmitted through the USB signal line and performing image processing based on the second signal; and in the programming mode, receiving a third signal transmitted through the USB signal line and modifying a content of a memory within the display system so as to update the function of the display system according to the third signal.

44. The method of claim 43, wherein in the programming mode, the third signal comprises recording commands and recording data such that the content of the memory is modified according to the recording commands and recording data.

45. The method of claim 43, further comprising determining whether to return to the normal mode from the programming mode according to the recording commands.

46. The method of claim 43, wherein in the programming mode, the modifying step of the content of the memory comprises: converting the recording commands into erase/read/write signals and converting the recording data into an address signal and a data signal for modifying the content of the memory.

47. The method of claim 43, wherein in the programming mode, the second signal comprises video signals such that the image processing step is performed on the video signals.

48. The method of claim 43, wherein the determining step comprising: determining whether a consecutive address sequence represented by the first signal matches that of a pre-set address sequence; and switching to the programming

*mode if the consecutive address sequence is determined to match that of the pre-set address sequence.*

*49. The method of claim 43, wherein the memory is a non-volatile memory.*

*50. The method of claim 43, wherein the switching step from the normal mode to the programming mode comprises switching from a visual path arranged for transmitting the second signal to imaging-processing circuits, to a recording path arranged for transmitting the third signal to a decoder coupled to the memory.*

*51. The method of claim 43, wherein the switching step from the normal mode to the programming mode comprises switching from a visual path coupled to a imaging-processing circuit for performing the image processing, to a recording path coupled to the memory.*

*52. A display device for reprogramming the function of a display system, comprising:*

*a detecting device for detecting a first signal transmitted through a serial signal interface and determining whether to generate a second signal indicative of a switching from a normal mode to a programming mode according to the first signal;*

*a starting and decoding device, coupled to the detecting device, for switching from the normal mode to the programming mode in response to the second signal, wherein*

*in the normal mode, the starting and decoding device transmits third signal transmitted through the serial signal interface to an imaging-processing circuit for receiving image processing, and*

*in the display in system programming mode, the starting and decoding device converts a fourth signal into a fifth signal for modifying a content of a memory within the display system so as to update the function of the display system.*

*53. A display system, comprising:*

*a serial signal interface;*

*a memory for storing data related to the function of the display system;*

*a display device, coupled to the serial signal interface and the memory, for receiving a first signal transmitted through the serial signal interface and determining whether to switch from a normal mode to a programming mode according to the first signal, wherein*

*in the normal mode, the display device receives a second signal transmitted through the serial signal interface and controls the second signal to receive image processing, and*

*in the programming mode, the display device receives a third signal transmitted through the serial signal interface and modifies a content of the memory so as to update the function of the display system according to the third signal.*

*54. A method for reprogramming the function of a display system, comprising:*

*receiving a first signal transmitted through a serial signal interface; and*

*determining to operate in a normal mode or a programming mode after receiving the first signal;*

*in the normal mode, receiving a second signal transmitted through the serial signal interface and performing image processing based on the second signal; and*

*in the programming mode, receiving a third signal transmitted through the serial signal interface and modifying a content of a memory within the display system so as to update the function of the display system according to the third signal.*

* * * * *